(12) United States Patent
Doljack et al.

(10) Patent No.: US 8,134,445 B2
(45) Date of Patent: Mar. 13, 2012

(54) RFID OPEN FUSE INDICATOR, SYSTEM, AND METHOD

(75) Inventors: Frank Anthony Doljack, Pleasanton, CA (US); Owais M. Mughal, Warrenton, MO (US); Hundi P. Kamath, Los Altos, CA (US); John M. Ackermann, Belleville, IL (US)

(73) Assignee: Cooper Technologies Company, Houston, TX (US)

( * ) Notice: Subject to any disclaimer, the term of this patent is extended or adjusted under 35 U.S.C. 154(b) by 599 days.

(21) Appl. No.: 12/059,950

(22) Filed: Mar. 31, 2008

(65) Prior Publication Data

US 2008/0231410 A1   Sep. 25, 2008

Related U.S. Application Data

(63) Continuation-in-part of application No. 10/828,048, filed on Apr. 20, 2004, now Pat. No. 7,369,029.

(51) Int. Cl.
*H01H 85/30* (2006.01)
*H01H 85/00* (2006.01)
*H01H 37/76* (2006.01)
*G08B 21/00* (2006.01)

(52) U.S. Cl. ........ 337/206; 337/241; 337/265; 340/638; 340/664; 327/525

(58) Field of Classification Search .................. 337/206, 337/241, 265; 327/525; 340/638, 664
See application file for complete search history.

(56) References Cited

U.S. PATENT DOCUMENTS

| 809,978 | A | * | 1/1906 | Ogle | 337/243 |
|---|---|---|---|---|---|
| 1,892,093 | A | * | 12/1932 | Battistella | 134/10 |
| 3,218,413 | A | * | 11/1965 | Koch | 337/197 |
| 3,662,369 | A | * | 5/1972 | Vinsani et al. | 340/638 |
| 4,081,853 | A | * | 3/1978 | Wickson | 361/104 |
| 4,199,736 | A | * | 4/1980 | McTaggart et al. | 333/17.2 |
| 4,263,589 | A | * | 4/1981 | Lewiner et al. | 340/638 |
| 4,281,322 | A | * | 7/1981 | Nasu et al. | 340/638 |
| 4,349,813 | A | * | 9/1982 | Ishibashi et al. | 340/638 |
| 4,554,607 | A | * | 11/1985 | Mora | 361/104 |
| 4,556,874 | A | * | 12/1985 | Becker | 340/638 |
| 4,616,207 | A | * | 10/1986 | Knapp et al. | 338/32 H |

(Continued)

FOREIGN PATENT DOCUMENTS

WO     2005104161 A1     11/2005

OTHER PUBLICATIONS

International Search Report and Written Opinion of PCT/US2009/038545; Sep. 15, 2009; 18 pages.

*Primary Examiner* — Bradley Thomas
(74) *Attorney, Agent, or Firm* — Armstrong Teasdale LLP

(57) ABSTRACT

Electrical fuse indicators, systems and methods for detecting when fuses enter an open state involve a wireless identification element, which alerts a communication unit that the fuse has entered an open state. The wireless identification device may include an antenna. The antenna may be in contact with a fuse element, such that opening of the fuse element renders the antenna inoperable. Alternatively the antenna may be connected to the fuse element in such a manner that opening of the fuse element alters the frequency on which the antenna transmits. A logic port may also be used to detect the operational state of a fuse. Use of such indicators is compatible with existing infrastructure.

14 Claims, 6 Drawing Sheets

U.S. PATENT DOCUMENTS

| | | | | |
|---|---|---|---|---|
| 4,635,044 | A | * | 1/1987 | South .................... 340/638 |
| 4,635,045 | A | * | 1/1987 | Miller et al. ............ 340/638 |
| H248 | H | * | 4/1987 | Middlebrooks ........ 340/639 |
| 4,661,807 | A | * | 4/1987 | Panaro .................. 340/638 |
| 4,691,197 | A | * | 9/1987 | Damiano et al. ...... 340/638 |
| 4,837,520 | A | * | 6/1989 | Golke et al. ........... 324/550 |
| 4,875,232 | A | * | 10/1989 | Shumway ............... 379/413 |
| 4,952,915 | A | * | 8/1990 | Jenkins et al. ........ 340/639 |
| 5,093,657 | A | * | 3/1992 | Bishop et al. ......... 340/638 |
| 5,121,318 | A | * | 6/1992 | Lipner et al. .......... 700/17 |
| 5,182,547 | A | * | 1/1993 | Griffith ................. 340/664 |
| 5,233,330 | A | * | 8/1993 | Hase ..................... 340/638 |
| 5,247,454 | A | * | 9/1993 | Farrington et al. .... 702/62 |
| 5,291,139 | A | * | 3/1994 | Fruhauf et al. ........ 324/550 |
| 5,343,192 | A | * | 8/1994 | Yenisey ................. 340/639 |
| 5,347,418 | A | * | 9/1994 | Ando et al. ........... 361/104 |
| 5,378,931 | A | * | 1/1995 | Bolda et al. ........... 307/131 |
| 5,404,049 | A | * | 4/1995 | Canada et al. ........ 327/525 |
| 5,418,515 | A | * | 5/1995 | Reyes .................... 337/206 |
| 5,561,580 | A | * | 10/1996 | Pounds et al. ........ 361/104 |
| 5,585,554 | A | * | 12/1996 | Handfield et al. ..... 73/146.5 |
| 5,680,877 | A | * | 10/1997 | Edstrand et al. ...... 134/103.1 |
| 5,731,760 | A | * | 3/1998 | Ramirez ................ 340/638 |
| 5,859,596 | A | * | 1/1999 | McRae .................. 340/870.02 |
| 5,883,575 | A | * | 3/1999 | Ruby et al. ............ 340/572.5 |
| 5,892,107 | A | * | 4/1999 | Farone et al. ......... 562/515 |
| RE36,317 | E | * | 9/1999 | Arratia ................... 337/206 |
| 6,025,783 | A | * | 2/2000 | Steffens, Jr. .......... 340/644 |
| 6,104,302 | A | * | 8/2000 | Vuong ................... 340/635 |
| 6,192,325 | B1 | * | 2/2001 | Piety et al. ............ 702/184 |
| 6,271,759 | B1 | * | 8/2001 | Weinbach et al. .... 340/635 |
| 6,366,208 | B1 | * | 4/2002 | Hopkins et al. ....... 340/650 |
| 6,434,715 | B1 | * | 8/2002 | Andersen ............... 714/39 |
| 6,450,182 | B2 | * | 9/2002 | Fillipi et al. .......... 134/22.1 |
| 6,466,032 | B2 | * | 10/2002 | Klaar ..................... 324/536 |
| 6,549,137 | B1 | * | 4/2003 | Bruchmann ........... 340/638 |
| 6,566,996 | B1 | * | 5/2003 | Douglass et al. ..... 337/243 |
| 6,597,179 | B2 | * | 7/2003 | St-Germain ........... 324/500 |
| 6,624,638 | B2 | * | 9/2003 | St-Germain ........... 324/500 |
| 6,633,475 | B2 | * | 10/2003 | Thiele ................... 361/104 |
| 6,691,064 | B2 | * | 2/2004 | Vroman ................. 702/183 |
| 6,696,969 | B2 | * | 2/2004 | Torrez et al. .......... 340/638 |
| 6,720,866 | B1 | * | 4/2004 | Sorrells et al. ........ 340/10.4 |
| 6,721,156 | B2 | * | 4/2004 | Masghati ............... 361/119 |
| 6,745,151 | B2 | * | 6/2004 | Marko et al. .......... 702/182 |
| 6,757,714 | B1 | * | 6/2004 | Hansen .................. 709/206 |
| 6,806,808 | B1 | * | 10/2004 | Watters et al. ........ 340/10.41 |
| 6,825,771 | B2 | * | 11/2004 | Bruno et al. .......... 340/638 |
| 6,839,597 | B2 | * | 1/2005 | Hattori et al. ......... 700/27 |
| 6,859,131 | B2 | * | 2/2005 | Stanek et al. ......... 337/206 |
| 6,895,368 | B2 | * | 5/2005 | Murakami ............. 702/188 |
| 7,034,660 | B2 | * | 4/2006 | Watters et al. ........ 340/10.41 |
| 2002/0021226 | A1 | * | 2/2002 | Clement et al. ....... 340/870.31 |
| 2002/0047770 | A1 | * | 4/2002 | Scoggin et al. ....... 337/167 |
| 2002/0097153 | A1 | * | 7/2002 | Youbok et al. ........ 340/572.5 |
| 2002/0149468 | A1 | * | 10/2002 | Carrender et al. .... 340/5.61 |
| 2002/0158776 | A1 | * | 10/2002 | Lash et al. ............ 340/984 |
| 2003/0020589 | A1 | * | 1/2003 | Scoggin ................ 337/186 |
| 2003/0133246 | A1 | * | 7/2003 | Masghati ............... 361/119 |
| 2005/0017908 | A1 | * | 1/2005 | Saegrov ................ 343/702 |
| 2005/0024218 | A1 | * | 2/2005 | Cuk ....................... 340/638 |
| 2005/0041507 | A1 | * | 2/2005 | Otsuka .................. 365/225.7 |
| 2005/0088271 | A1 | * | 4/2005 | Lau et al. .............. 337/206 |
| 2005/0212526 | A1 | * | 9/2005 | Blades .................. 324/543 |
| 2006/0077611 | A1 | | 4/2006 | Bender et al. |
| 2008/0137253 | A1 | * | 6/2008 | George et al. ......... 361/93.1 |

* cited by examiner

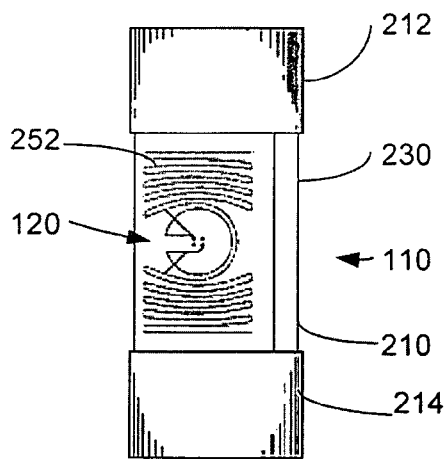
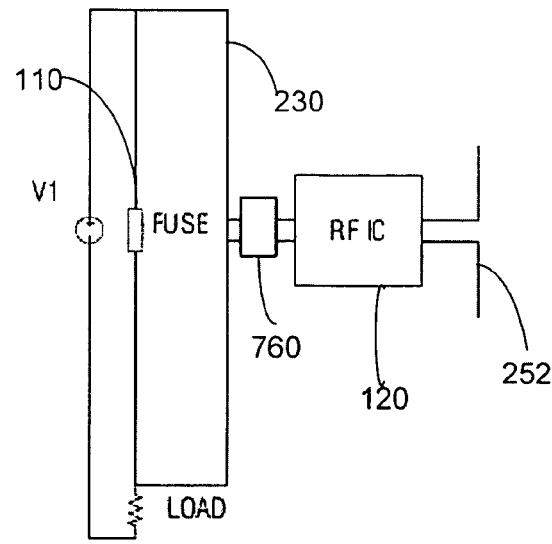
Fig. 6  Fig. 7
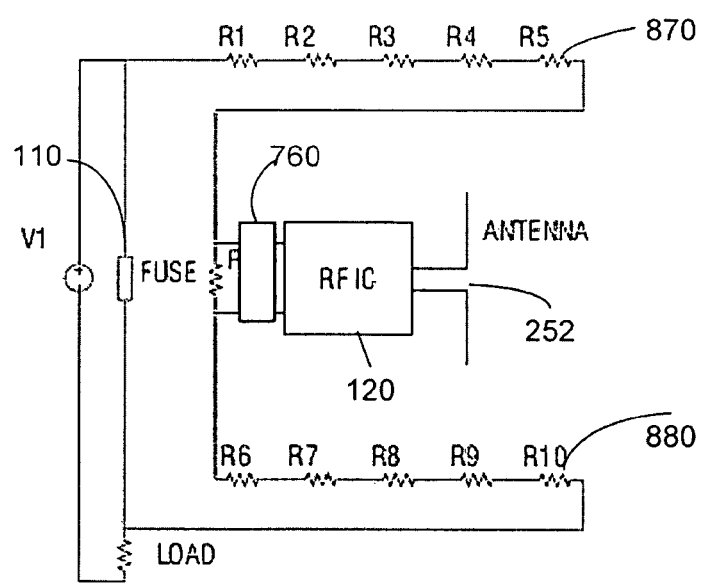
Fig. 8

RFID OPEN FUSE INDICATOR, SYSTEM, AND METHOD

CROSS-REFERENCE TO RELATED APPLICATION

This application is a continuation-in-part and claims benefit to "Wireless Communication Fuse State Indicator System and Method", U.S. patent application Ser. No. 10/828,048, filed Apr. 20, 2004 now U.S. Pat. No. 7,369,029, which is incorporated by reference as if fully set forth herein.

BACKGROUND OF THE INVENTION

This invention relates generally to fuses, and more particularly to fuses having fuse state indicators.

Fuses are widely used overcurrent protection devices having a primary fusible link or primary fuse element assembly extending between conductive terminal elements, such as end caps or blade terminals. When the terminal elements are electrically connected to an energized electrical circuit, current flows through the primary fusible link or fuse element assembly. The primary fusible link or fuse element assembly is designed to physically melt, disintegrate, or otherwise structurally fail when the current flowing through the fuse reaches a predetermined level, thereby opening the electrical circuit through the fuse and protecting associated electrical equipment and components from damage. Once the fusible link has operated and opened the circuit, the fuse may be removed and replaced with another fuse to once again complete the circuit.

Identifying open fuses for replacement is not always an easy endeavor, especially in larger electrical systems employing a large number of fuses. To assist in locating opened fuses in a more efficient manner, various types of fuse state indicators have been developed which may be used to indicate an operative state of the fuse. Known indicators, for example, provide local fuse state identification features built into a housing of the fuse, such as lamps, light emitting diodes, temperature responsive materials, mechanical pins and flags which indicate opened fuses via a change in appearance of the fuse. Such indicators, however, are disadvantaged in several aspects.

For example, mechanical indicators have been developed including spring loaded elements which are released when the primary fuse element opens. Such mechanical indicators, however, can be difficult to assemble and may not be as reliable as desired.

Other types of fuse state indicators indicate an operative state of the fuse by a physical transformation in the appearance of a fuse. Typically, this entails a conductive indicator link assembly extending on an exterior surface of the body of the fuse. The external link forms a secondary fuse link external to the body of the fuse and is connected in parallel with the primary fuse element within the body of the fuse. Either the indicator link itself or other portions of the indicator assembly changes color when the indicator link opens in an overcurrent condition. These types of indicators, however, have proven difficult to reliably terminate the external indicator links to the terminal elements of the fuse.

Further, some known fuses include alarm terminals which may signal an external device (e.g., a computer or a relay) of an opened fuse. Such remote fuse state indication, however, entails a hard wired point-to-point connection between the fuse alarm terminal and the external device. Many fused systems are not wired for this purpose.

Regardless of the type of indicator used, manufacturing limitations tend to produce some variability in result or effect when fuses open, and such variability may make it difficult to locate opened fuses despite the indicators. For example, one fuse may exhibit an obvious change in appearance when the primary fuse element opens while another fuse may exhibit only a slight change when the primary fuse element is opened. The slight change may not be evident to personnel expecting to see the obvious change.

Additionally, a considerable period of time may elapse before a given fuse opens, and the lapse of time may decrease the likelihood that the indicator will operate properly. This is particularly the case for mechanically actuated indicating systems, fuse state indicators including lamps and illuminators, and fuse state indicators including temperature responsive materials which may degrade over time.

Still further, fuses having known indicators must typically be installed in a particular orientation in an electrical system so that the indicator is visible for inspection. If the fuse has to be removed from an electrical system to inspect the indicator, the value of the indicator is lost. Also, if a fuse is improperly installed, which may not be evident from a visual inspection of the fuse, current may not flow properly through the fuse and the indicator will not function as it was designed. In such circumstances, known indicators are ineffective to identify a problem fuse.

BRIEF DESCRIPTION OF THE INVENTION

According to an exemplary embodiment, an electrical fuse comprises a protective body, terminal elements extending from the protective body, a primary fuse element extending within the protective body and electrically connected between the terminal elements, and an identification element configured to transmit a wireless signal to a remote device for determining an operational state of said primary fuse element.

According to another exemplary embodiment, a fuse state identification system is provided. The system comprises at least one fuse comprising a protective body, terminal elements coupled to the protective body, a primary fuse element extending within the protective body and electrically connected between the terminal elements, and an identification element located between said terminal elements. A remote communicating device is configured to communicate with the identification element through an air interface.

In yet another exemplary embodiment, a fuse state indication system comprises a radio frequency identification tag comprising a transmitter, wherein the tag is electrically connected to a fuse comprising a primary fuse element, and a radio frequency interrogation device configured to transmit wireless communication with the tag for determination of an operative state of the fuse.

In still another embodiment a method for indicating an opened fuse in a fused system having at least one fuse with a fuse state identification element therein and a communication device remote from the fuse is provided. The method comprises transmitting a signal to the identification element of the fuse with the communication device through an air interface, awaiting a response from the identification element to the communication device, and determining the operational state of the fuse based upon the response or lack thereof from the identification element.

In another embodiment, an identification element antenna attaches to the secondary fuse link. As a result, the status of the primary fuse element directly impacts the functionality of the identification element. In the event the primary fuse element opens, the identification element becomes inoperable as a direct result. A communication device correlates the response or lack thereof from the identification element with the status of the corresponding fuse depending on the embodiment to determine fuse status.

In another embodiment, the identification element antenna is connected indirectly to the secondary fuse link. A change in the state of the primary fuse element impacts the antenna in such a manner that the central frequency of the identification element antenna is altered. Such an alteration is detectable by the communication device in different ways depending on the embodiment.

Another embodiment uses a logic port connected to the secondary fuse link and an identification element. When the primary fuse element changes state, such a change is detected by the logic port. The state change is then part of the response transmitted by the identification element during interrogation.

BRIEF DESCRIPTION OF THE DRAWINGS

FIG. 4b shows an electrical schematic of the fuse shown in FIG. 4a;

FIG. 5c shows an electrical schematic of the fuse shown in FIG. 5a;

FIG. 6 shows a diagram of a fuse with an identification element attached in such a manner that the state of the primary fuse element impacts the central frequency of the identification element antenna;

FIG. 7 shows an electrical schematic where the fuse interacts with a logic port which may record the state of the primary fuse element in accordance with an exemplary embodiment;

FIG. 8 shows a circuit diagram where the fuse interacts with a logic port that may record the state of the primary fuse element through a series of resistors in accordance with an exemplary embodiment;

DETAILED DESCRIPTION OF THE INVENTION

Figure 1:
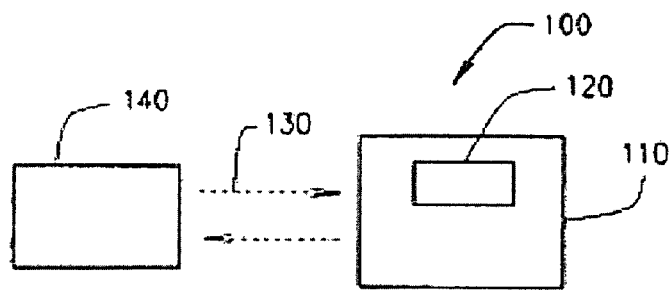
FIG. 1 is a schematic block diagram of an exemplary embodiment of a fuse state identification system.

FIG. 1 is a schematic block diagram of an exemplary embodiment of a fuse state identification system 100 including a fuse 110 having an identification element or tag device 120 coupled thereto which communicates, via a wireless connection 130, with a remote device 140 such as a reader or interrogator device described below. The identification element 120 is electrically connected to the fuse 110 and may be used to determine whether the fuse 110 is in an operational state (i.e., a current carrying or unopened condition completing an electrical connection through the fuse), or whether the fuse 110 is in a non-operational state (i.e., an opened condition breaking the electrical connection through the fuse).

As explained below, signal transmission from the identification element 120 to the communicating device 140 may reliably indicate the operating state of the fuse 110 on demand. Signal transmission from the identification element 120 to the communicating device 140 is conducted through an air interface and point-to-point wiring is avoided. The system 100 may therefore be used universally with existing fused systems without retrofitting or modification thereof with wires or signal conductors to connect the fuse to the communication device.

Still further, the system 100 may communicate, in addition to the opened or unopened state of the fuse, other information of interest regarding the fused system. In particular, the system 100 may be used to identify improperly installed or malfunctioning fuses, as well as to provide information pertaining to the electrical system associated with the fuse 110. The system 100 is implemented electronically and avoids degradation issues from the passage of time, and may be implemented in a cost effective manner.

In an exemplary embodiment, the communicating device 140 and the identification element 120 communicate via radio frequency and the system operates in accordance with known radio frequency identification (RFID) systems. As such, and as those in the art may appreciate, the identification element 120 is an RFID identification tag and the communicating device 140 is an RFID reader or an interrogator. Thus, the system operates on close proximity electromagnetic or inductive coupling of the identification element 120 and the communicating device 140, or alternatively operates using propagating electromagnetic waves. It is contemplated, however, that other forms and types of wireless communication may be utilized in lieu of RFID communication, including but not limited to infrared communication, without departing from the scope and spirit of the invention.

Figure 2:
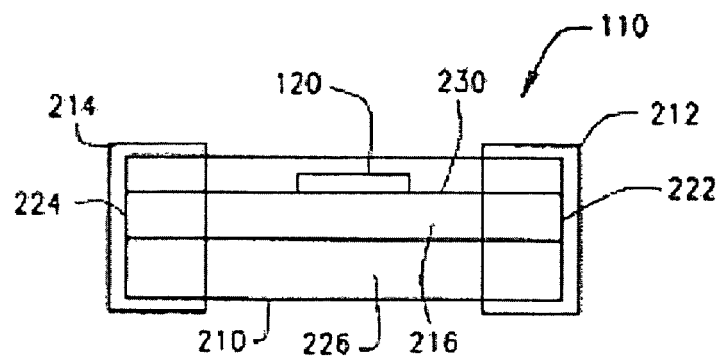
FIG. 2 is a cross sectional schematic view of an exemplary embodiment of a fuse for the fuse state identification system shown in FIG. 1.

FIG. 2 is a cross sectional schematic view of an exemplary embodiment of the fuse 110 for use in the system 100 (shown in FIG. 1). In accordance with known fuses, the fuse 110 includes a protective body 210 fabricated from an insulative (i.e., non-conductive) material, conductive terminal elements 212, 214 coupled to the body 210, and a primary fuse element 216 extending within the body 210 and electrically connected between the terminal elements 212, 214. The primary fuse element 216 is constructed, sized, and dimensioned to melt, disintegrate, vaporize, or otherwise structurally fail upon the occurrence of a predetermined current condition (i.e., a fault current) to break or open the electrical connection through the fuse 110 between the terminal elements 212, 214. Opening of the primary fuse element 216 in such a manner protects electrical components and equipment associated with the fuse 110 from damage which may otherwise result from the fault current. Various types of fuse elements and assemblies are known for accomplishing this objective, and the invention is not limited to any particular type or configuration of the primary fuse element.

In an illustrative embodiment, the fuse 110 is a cylindrical cartridge fuse including a cylindrical body 210 having a first end 222, a second end 224, and a bore 226 extending there between. The primary fuse element 216 extends through the bore 226 and is connected to the terminal elements 212 and 214 in a known manner, e.g., via soldering to the terminal elements 212 and 214 or via conductive washers (not shown) which engage the elements 212, 214. In one embodiment, the terminal elements 212, 214 are conductive ferrules or end caps and are attached to the respective ends 222, 224 of the body 210 in a known manner, such as with crimping techniques. When the terminal elements 212, 214 are connected to line-side and load-side electrical circuitry (not shown) a current path is formed through the primary fuse element 216. While a cylindrical or tubular body 210 is illustrated in FIG. 2, it is understood that other shapes and configurations of bodies or housings may be employed in alternative embodiments, including but not limited to rectangular fuse modules. Likewise, a variety of terminal elements may be used in lieu of the end caps 212 and 214 without departing from the scope and spirit of the invention.

The identification element 120 is electrically connected to the secondary fuse link 230 and is positioned interior of the fuse body 210; although it is understood that in an alternative embodiment, the identification element 120 may be located on an outer surface of the body 210. In the illustrated embodiment, the identification element 120 is connected to the terminal elements 212, 214 in a known manner through a fine fuse wire or other conductive material having a much greater electrical resistance than the primary fuse element 216. As such, only a very small portion of the current flowing through the fuse 110 flows through the identification element 120, and the identification element 120 may therefore monitor a relatively small current to indicate the state of the fuse 110 as described below.

In an exemplary embodiment, the identification element 120 is a known RFID transponder device which communicates wirelessly with the communication device 140 (shown in FIG. 1) via an air interface over a predetermined radio frequency carrier, for example, 100-500 kHz, and more particularly, at about 125 kHz. It is understood, however, that other frequency carriers may be employed per applicable RFID standards. Also, it is recognized that data transmission rates between the identification element 120 and the communication device 140 are impacted by the selected carrier frequency for signal transmission. That is, the higher the frequency, the higher the transmission rate between the devices.

The operating range or distance of communication between the communication device 140 and the identification element 120 is dependent upon the power level of the devices, which may be, for example from 100-500 mW or as dictated by applicable regulations. The range is principally affected by the power available at the communication device 140 to communicate with the identification element 120, the power available within the identification element 120 to respond, and environmental conditions and the presence of structures in the operating environment. In one embodiment the power level of the identification element 120 is much less than the power level of the communication device 140. It is believed that those of ordinary skill in the art would be able to select appropriate power levels to meet desired specifications and objectives for a particular operating environment without further explanation.

Figure 3:
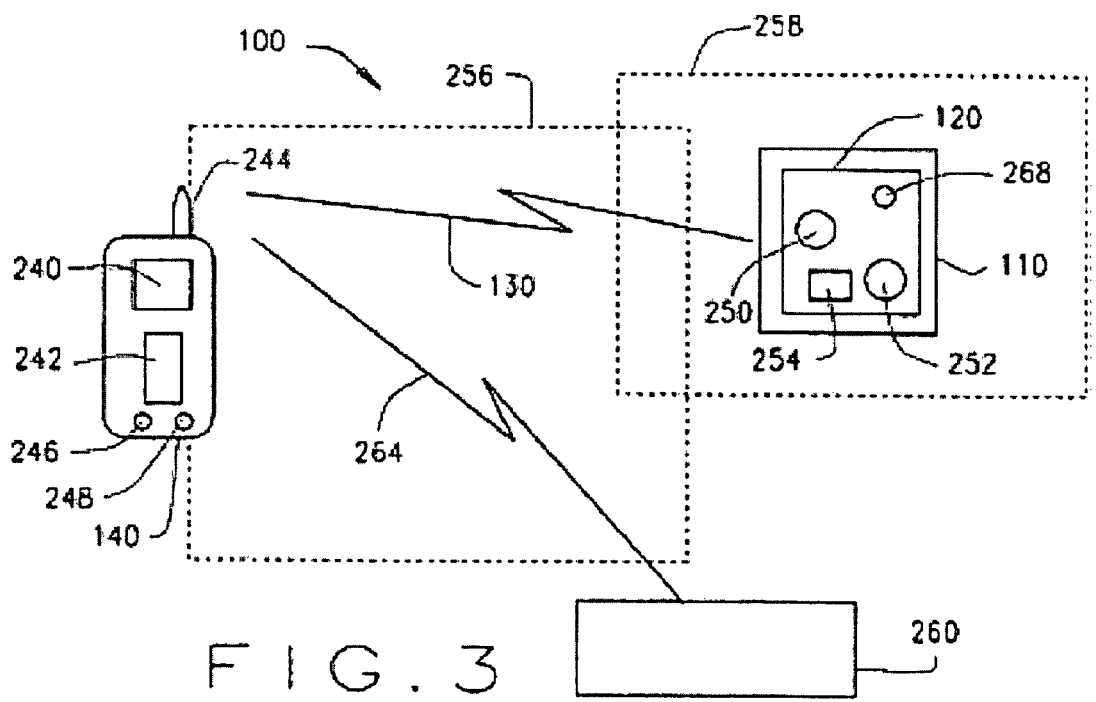
FIG. 3 is a schematic view of the fuse state identification system shown in FIG. 1 in more detail.

Referring now to FIG. 3, in an exemplary embodiment, the communication device 140 includes a display 240, an interface 242, an antenna 244, and optionally includes a processor 246 and a memory 248. The operation of the communication device 140 is described in some detail below.

The identification element 120 of the fuse 110 includes a processor 250, an antenna 252, a radio (not shown) and a memory 254, which in various embodiments may be read-only memory (ROM), random access memory (RAM), or non-volatile programming memory, such as electrically erasable programmable memory (EEPROM), depending on the sophistication of the element 120. The processor 250 communicates, via radio frequency by a wireless connection 130 (shown in FIG. 1), with the communication device 140 when interrogated by the communication device 140, and the antenna 252 senses a field generated by the communication device 140 in operation. The antenna 252 also serves to transmit a response to the communication device 140 in a known manner.

As explained below, the operational state of the fuse 110 may be determined by a response, or lack of response, from the identification element 120 to an interrogation by the device 140. The communication device 140 may be used to test and diagnose the operational state of a number of fuses 110 without disconnecting the fuses 110 from the associated circuitry. On demand by a user, the device 140 interrogates the identification element 120 via wireless communication (e.g., radio frequency communication) over an air interface such that a transmission field 256 of the communication device antenna 244 interacts with a transmission field 258 of the identification element antenna 252. In response to the interrogation, the identification element 120 answers the device 140. Depending upon the sophistication of the communication protocol and the relation of the identification element to the primary fuse element 216 and/or the secondary fuse link 230 of the fuse 110, the operational state of the fuse 110 may be determined in a variety of ways by the processor based identification element 120.

In an exemplary embodiment, the identification element 120 is a passive radio frequency transmitter, and relies upon a transmission field generated by the communication device 140 for power to respond to the device 140. In such an embodiment, the identification element 120 does not store data relating to the operational state of the fuse 110.

In an alternative embodiment, the identification element 120 is an active radio frequency transponder, and is powered by an onboard power supply, such as a battery 268, or alternatively, is powered by the electrical current passing through the secondary fuse link 230 (shown in FIG. 2). As such, the identification element 120 is capable of storing data and transmitting the data to the communication device 140 when interrogated. That is, in such an embodiment the identification element 120 is a read and write device and is capable of advanced functions, such as problem diagnosis and troubleshooting.

The processor based communication device 140 may be programmed to interpret responses to interrogations and provide an output to a user in a readable form as described below.

For example, in one embodiment any signal received from the identification element 120 in response to an interrogation by the communication device 140 may be taken as an indication that the primary fuse element 216 (shown in FIG. 2) is operational. For example, considering the fuse 110 shown in FIG. 2, when the primary fuse element 216 opens the entire fault current would be directed to the identification element 120, and if the identification element 120 is selected so that the fault current destroys or renders the element 120 inoperable, the element 120 could not function to respond after the fuse 110 has opened. Thus, if no response is received from a given identification element 120, it may be presumed that the associated fuse has operated.

Similarly, in another embodiment the identification element 120 could be merely physically located in proximity to the primary fuse element 216 and/or the secondary fuse link 230 without being electrically connected to the terminal elements 212 and 214, the primary fuse element 216 or the secondary fuse link 230. In such an embodiment, heat and electrical arcing associated with opening of the primary fuse element 216 would damage the identification element 120 and prevent it from responding to an interrogation. Thus, if no response is received from a given identification element 120, it may be presumed that the associated fuse has operated.

As another example, through strategic selection of the identification element 120 and with strategic connection of the identification element 120 to the fuse 110, the identification element 120 may withstand opening of the primary fuse element 216 and determine the opening of the primary fuse element 216 via, for example, current or voltage sensing of the electrical circuit through the fuse 110. In such an embodiment, the identification element 120 may respond in a first manner when the fuse 110 is in an operational state and respond a second manner different from the first when the fuse 110 is in a non-operational state.

When used in a scanning motion past a number of fuses 110, the communication device 140 may interrogate the identification elements 120 of the fuses 110 and determine, based upon the type of responses received, which, if any, of the fuses 110 are inoperative.

In a more advanced communications protocol, a response from an identification element 120 may be decoded by the device 140, thereby allowing communication of specific data stored in the identification element 120 to be communicated to the communication device 140. For example, one or more of an identification code, a location code, a manufacturing date, etc. and even data pertaining to current characteristics over time may be stored in the memory 254 of the identification element 120. Thus, the system 100 could be of aid in troubleshooting an electrical system. Improperly installed fuses or malfunctioning fuses, may likewise be detected and diagnosed with appropriate programming of the identification element 120 and the communication device 140.

In one embodiment, response information transmitted from the identification elements 120 of fuses 110 may be displayed directly to a user via the display 240 in a hand held device 140, therefore providing real time feedback regarding the state of the fuse or fuses in the vicinity of the communication device 140 which have been interrogated. In a further and/or alternative embodiment, the processor 246 of the device 140 processes and compiles data and information relating to the state of fuses as interrogations are made and as replies are received, and the data and information is then stored in the memory 248 of the device 140. Such data and information stored in the memory 248 may be downloaded to an information management system, or host computer, 260 using a communication link 264, such as, for example, the internet or other network connection, a wireless connection (e.g., radio frequency), an optical communication link, etc. as those in the art will appreciate. The information management system 260 processes and stores the information and data for evaluation by a user for analysis. Any fuses 110 which have operated and require replacement may be identified, together with other data of interest regarding the fused system. Improperly installed fuses or malfunctioning units, may likewise be detected and diagnosed with appropriate programming of the identification element 120 and the communication device 140.

Data from the information management system 260 may likewise be transferred from the information management system 260 to the communication device 140, and the data may be used, for example, to match responses from selected identification elements 120 with specific fuses 110 in the system.

Also, such data may be used to generate interrogatories to specific fuses 110 of a system. In such an embodiment the identification elements 120 of the fuses 110 may be programmed to ignore certain interrogatories and to respond to other interrogatories from the communication device 140. Further, the identification elements 120 of the fuses 110 may be programmed to respond differently as different interrogatories are made. For example, an identification element 120 may send a very basic response to a basic interrogatory, or a detailed response including supporting data for a more advanced interrogation.

The following exemplary embodiments describe in more detail components and systems for interrogating fuses and for transmitting a response from said fuses. Responses transmitted from fuses may contain unique identification codes to designate which fuse is currently under interrogation.

Figure 4A:
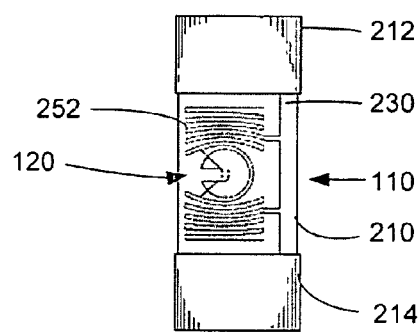
FIG. 4a shows a diagram of a fuse with an identification element antenna coupled with the secondary fuse link.
Figure 4B:
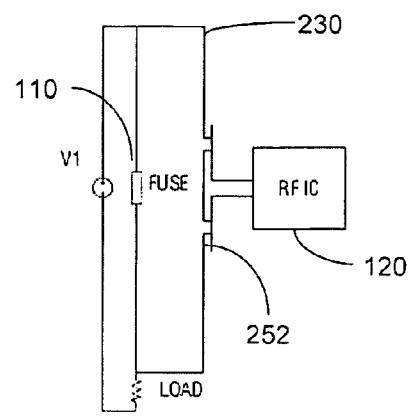

FIG. 4a shows a diagram of a fuse with an identification element antenna coupled to the secondary fuse link. FIG. 4a illustrates an embodiment of the invention that integrates an identification element 120 to a secondary fuse link 230, which is coupled to each of the terminal elements 212, 214 of a fuse 110 hereinafter referred to as the actuator embodiment. FIG. 4b shows an electrical schematic of the fuse shown in FIG. 4a. The identification element 120 and secondary fuse link 230 are linked in such a manner that the identification element 120 may become inoperable in the event the secondary fuse link 230 opens due to an operated condition of the primary fuse element 216 (not shown). The secondary fuse link 230 may be designed to vaporize, disintegrate, or otherwise structurally fail upon the opening of the primary fuse element 216. In the actuator embodiment, the identification element 120 is linked to the secondary fuse link 230 in such a manner that the opening of the secondary fuse link 230 damages the circuit connected to the antenna 252 of the identification element 120 rendering the antenna 252 inoperable. The secondary fuse link 230 may be physically connected to the antenna 252, or the antenna 252 and the secondary fuse link 230 may share a common portion. When the communication device 140 interrogates the identification element 120 in the actuator embodiment, the interrogator 140 awaits responses from the identification element 120 associated with the fuse 110. A lack of response from the identification element 120 indicates that the fuse 110 associated with the identification element 120 has operated. Alternatively, a response from the identification element 120 indicates that the fuse 110 associated with the identification element 120 is in an operational state.

While the identification element 120 is electrically coupled to the secondary fuse link 230, it is understood that the identification element 120 and the secondary fuse link 230 may be located on either the interior side or the exterior side of the protective body 210.

Figures 5A, 5B:
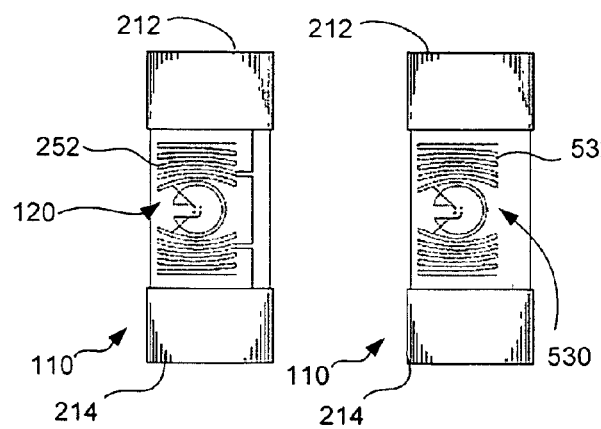
FIG. 5a shows a diagram of one side of a fuse in an alternative embodiment of the device from FIG. 4a with a second identification element coupled to the fuse.
FIG. 5b shows a diagram of an opposing side of the fuse shown in FIG. 5a depicting the second identification element.
Figure 5C:
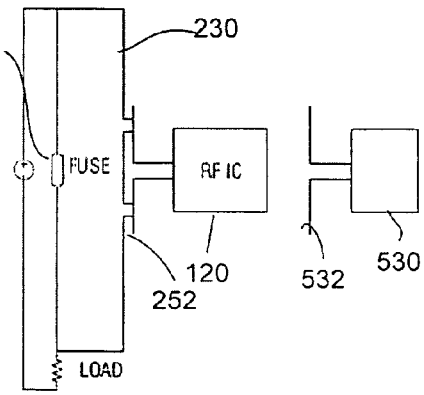

FIGS. 5a and 5b show a diagram of an alternative embodiment of the device from FIG. 4a with a second identification element coupled to the fuse body 210. FIG. 5a illustrates how the identification element 120 is integrated with the secondary fuse link 230, which is coupled to each of the terminal elements 212, 214 of a fuse 110. Additionally, FIG. 5b shows a diagram of an opposing side of the fuse shown in FIG. 5a depicting the second identification element 530 coupled to the fuse body 210, but not in electrical contact with either the primary fuse element 216 or the secondary fuse link 230. The second identification element 530 may be coupled internally or externally of the fuse 110. FIG. 5c shows an electrical schematic of the fuse shown in FIG. 5a. As with the actuator embodiment, opening of the secondary fuse link 230 may cause the antenna 252 associated with the first identification element 120 to become inoperable, thereby preventing the first identification element 120 from transmitting a signal upon receiving an interrogation from the remote device 140. The second identification element 530 is coupled to the fuse 110 in such a manner that when the fuse 110 operates and enters an open state, the second identification element 530 remains operational since the circuit of the second identification element antenna 532 is not damaged. Since the circuit of the second identification element antenna 532 is not electrically coupled to the primary fuse element 216 or the secondary fuse link 230, the opening of the primary fuse element 216 and the secondary fuse link 230 does not impact the functionality of the second identification element antenna 532. As a result, the second identification element 530 responds to interrogation with a second unique response regardless of the state of the fuse 110. Thus, a functional fuse 110 may broadcast responses from two identification elements 120, 530, while an open fuse 110 may broadcast a response only from the second identification element 530, since the secondary fuse link 230 of the open fuse has opened, thereby causing the first identification element 120 to become inoperable. The responses of both the identification elements 120, 530 will have a fixed relationship between them such that the receipt of a broadcast from the second identification element 530 may allow the communication device 140 to predict the expected broadcast of the corresponding first identification element 120. These responses may be unique in order to identify the appropriate fuse 110 upon interrogation. This embodiment allows detection of open fuses by identifying a response from the second identification element 530 that does not come with a corresponding response from the first identification element 120. This removes the need for a communication device 140 to keep a record of expected responses since the communication device 140 only has to look for individual responses to see if a predicted second response has been received. Although this embodiment shows that the first identification element and the second identification element responds with a first and second unique response, the responses may be a simple signal indicating an operational status, without departing from the scope and spirit of the exemplary embodiment.

FIG. 6 shows a diagram of a fuse with an identification element attached in such a manner that the state of the primary fuse element impacts the central frequency of the identification element antenna. FIG. 6 shows an embodiment, hereinafter referred to as the center frequency embodiment, which links the identification element 120 with the secondary fuse link 230 via an inductive or capacitive coupling placed between the terminal elements 212, 214 of the fuse 110. The identification element 120 broadcasts on a frequency that varies based on the integrity of the secondary fuse link 230. An identification element 120 connected by inductive or capacitive connections to the secondary fuse link 230 may alter the antenna 252 characteristics upon an open condition. The identification element 120 of a closed fuse may broadcast on a first frequency, while the broadcast frequency may shift to a second frequency when the fuse 110 opens. The communication device 140 may detect an open fuse by the simultaneous absence of the first frequency signal associated with a closed fuse along with the existence of the second frequency signal associated with an open fuse. Although this embodiment shows the communication device detecting the first frequency signal and the second frequency signal to determine the operational state of the fuse, the communication device may determine the operational state of the fuse by only the absence of the first frequency or by only the presence of the second frequency without departing from the scope and spirit of the exemplary embodiment.

Another embodiment of the invention alters the center frequency where the resulting shift in frequency removes the information typically encoded in the response. This embodiment is hereinafter referred to as the alternative center frequency embodiment. The removal of the response information due to frequency shift may be the result of several factors. One example is the shift in central frequency is so extreme that the signal cannot support the transmission of the response information. The communication device may compare the received responses against the list of known responses to identify an open fuse.

FIG. 7 shows an electrical schematic where the fuse interacts with a logic port which may record the state of the primary fuse element in accordance with an exemplary embodiment. An exemplary embodiment of the invention uses a logic port 760 to determine fuse 110 status, hereinafter refer to as the logic port embodiment. The secondary fuse link 230 interfaces with a logic port 760 attached to an identification element 120. When the fuse 110 opens, the logic port 760 changes state and records the state change in memory. The logic port 760 would provide operating voltage to the processor 250 temporarily to indicate that the fuse 110 was opened. When the fuse 110 is closed the logic port 760 would have zero voltage and the processor 250 would be in an inactive state. Upon the fuse 110 opening, the voltage would change abruptly to a finite value and this voltage would activate and power the processor 250 long enough to update the memory, thus indicating that the fuse 110 has opened. The memory used for recording the state change may be located in the identification element 120, the logic port 760, or any other location known to those skilled in the art that would allow the state change to be transmitted during interrogation by the communicating device 140. The identification element 120 broadcasts the state change with the response upon interrogation.

FIG. 8 shows a circuit diagram where the fuse interacts with a logic port that may record the state of the primary fuse element through a series of resistors in accordance with an exemplary embodiment. This alternative to the logic port embodiment uses resistors, hereinafter referred to as the resistor embodiment. The example shown in FIG. 8 is for illustrative purposes only. A resistor or series of resistors 870, 880 are arranged to connect the logic port 760 with an attached identification element 120. The resistors may be located before and after the connection to the logic port 760. The resistors 870, 880 possess sufficient resistance to minimize current from being carried across them so long as the fuse 110 remains closed. This embodiment utilizes one or more resistors 870, 880 in any configuration known to those skilled in the art. When the fuse opens, the current flows through the resistors 870, 880 at an increased level. This increase in current level causes a state change in the logic port 760, which may then be recorded in a memory as illustrated in the logic port embodiment. This change in state is communicated along with the response during interrogation by the communication device 140.

Figure 9:
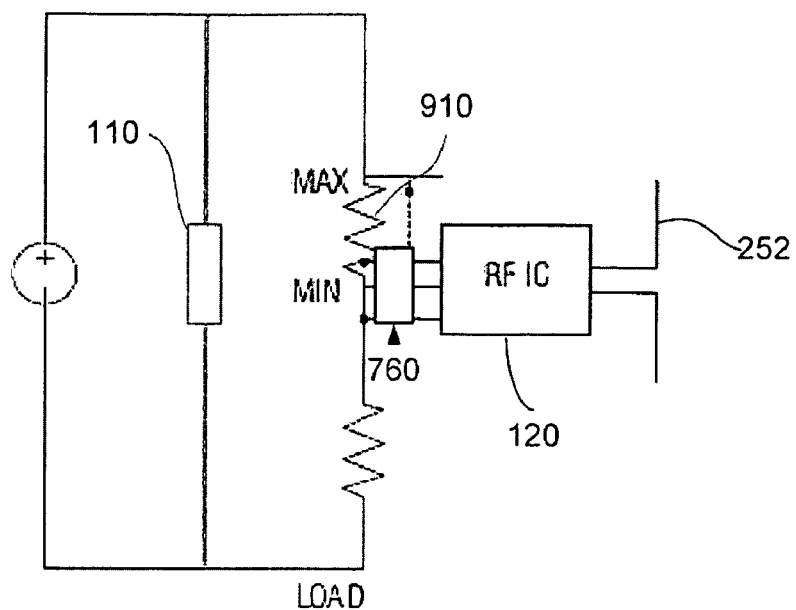
FIG. 9 shows a circuit diagram where the fuse interacts with a logic port that may record the state of the primary fuse element through a continuous resistance element in accordance with an exemplary embodiment.

FIG. 9 shows a circuit diagram where the fuse interacts with a logic port that may record the state of the primary fuse element through a continuous resistance element in accordance with an exemplary embodiment. This alternative to the resistor embodiment makes use of a continuous resistance element 910 in lieu of, or in addition to, the resistor or series of resistors located before and after the connection to the logic port 760, hereinafter referred to as the continuous resistor embodiment shown in FIG. 9. The difference between the resistor embodiment of FIG. 8 and the continuous resistor embodiment of FIG. 9 comes from replacing the resistors 870, 880 with a continuous resistance element 910. The logic port 760 is connected to a portion of said continuous resistance element 910. The resistance that must be overcome to trip the state of the logic port 760 is a function of the location where the logic port 760 couples to the continuous resistance element 910. When the fuse opens, the current flows through the continuous resistance element 910. The increased level in current causes a state change in the logic port 760, which may then be recorded in the memory as previously described in the logic port embodiment. This change in state is then communicated along with the response during interrogation.

Figure 10:
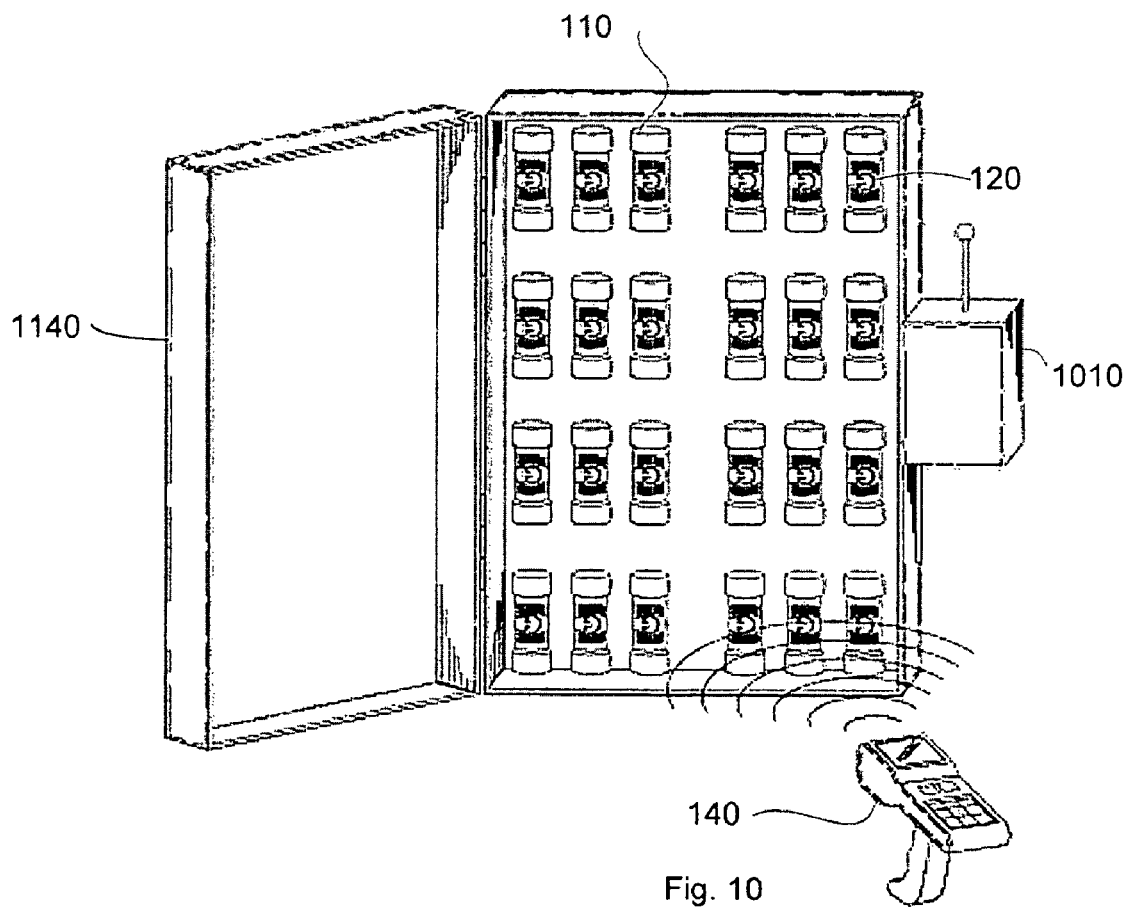
FIG. 10 shows a schematic view of a system where a portable communication device interacts with identification elements in fuses located in an electrical panel with an optional electrical panel identification element in accordance with an exemplary embodiment.

FIG. 10 shows a schematic view of a system where a portable communication device interacts with identification elements in fuses located in an electrical panel with an optional electrical panel identification element in accordance with an exemplary embodiment. The preceding embodiments receive information related to the operational status of individual fuses. Additional embodiments aid the communication device 140 in locating a particular fuse 110. The electrical panel identification element 1010 shown in FIG. 10 works in conjunction with the identification elements 120 coupled to the fuses 110 by identifying which electrical panel 1140 the fuse 110 is located in depending on the embodiment. This embodiment may be useful in situations where more than one panel is in range of the communication device 140.

In one embodiment, the panel identification element 1010 is a low power radio frequency (RF) signal device that digitally transmits a data packet in a wireless manner. Point-to-point wiring in the electrical system for fuse monitoring systems is therefore avoided. However, it is understood that point-to-point wiring may be utilized in some embodiments. Additionally, while a low power digital radio frequency device has been specifically described, it is understood that any of the aforementioned wireless communication schemes and equivalents may alternatively be used if desired.

The electrical panel identification element 1010 may communicate various pieces of information depending on the embodiment, including the designation of said electrical panel, electrical panel location, and the expected responses of the fuses in said electrical panel. Further embodiments of the electrical panel identification element 1010 include a functionality to interrogate identification elements 120 in fuses 110 stored in the electrical panel and record said fuse 110 information in the electrical panel identification element 1010 memory and/or retransmit the information to another location, including, but not limited to, a handheld device or a computer.

The previously disclosed embodiments transmit information to a communication device 140, which interprets the information sent in a manner users may understand. Communication devices 140 may either prompt the identification elements 120 to broadcast their response or may passively detect any response being transmitted by the identification element 120. Identification elements 120 interact with a communication device 140. Configurations of how the communication device 140 interprets the responses received correspond with embodiments of the invention under interrogation (identification elements 120 or electrical panel identification element 1010). In the exemplary embodiments, the radio frequency communication is used. The communication device 140 includes a processor, an antenna, and a memory. The processor communicates, via radio frequency, with the identification elements, and the antenna is used to send signals to the identification element and receive signals from the embodiment in operation. The memory may be read-only memory (ROM), random access memory (RAM), or non-volatile programming memory, such as electrically erasable programmable memory (EEPROM), and their equivalents depending on the sophistication of the communication device. The memory may include executable instructions and control routines for execution by the processor.

Several ways of using the communication device 140 are available. One embodiment of the system used to interrogate various identification elements 120, 1010 utilizes a portable communication device 140 as shown in FIG. 10. The portable communication device 140 interrogates fuses 110 with identification elements 120 along with the electrical panel identification element 1010 (if used in the embodiment) within the range of the portable communication device 140 to determine which fuses have operated and need replacement. The use of electrical panel identification elements 1010 provide the communication device 140 with information that identifies a particular panel a fuse 110 is located in.

The information used by the communication device 140 is contained in a template (not shown). The template contains any information that allows the communication device 140 to interpret the information or lack thereof from the identification elements 120, 1010. One embodiment requires the portable communication device 140 to compare the detected responses against a list of expected responses as defined by the template. Another embodiment detects discrepancies in the response compared against the template. Examples of conditions indicating an open fuse based on the template may include the absence of a response, the absence of a response coupled with the detection of its corresponding second response, or a shift in the central frequency of the antenna 252 of the identification element 120. Further, the operational state of the fuse 110 may be determined based on an interpretation of the response by an algorithm contained in the template.

Figure 11:
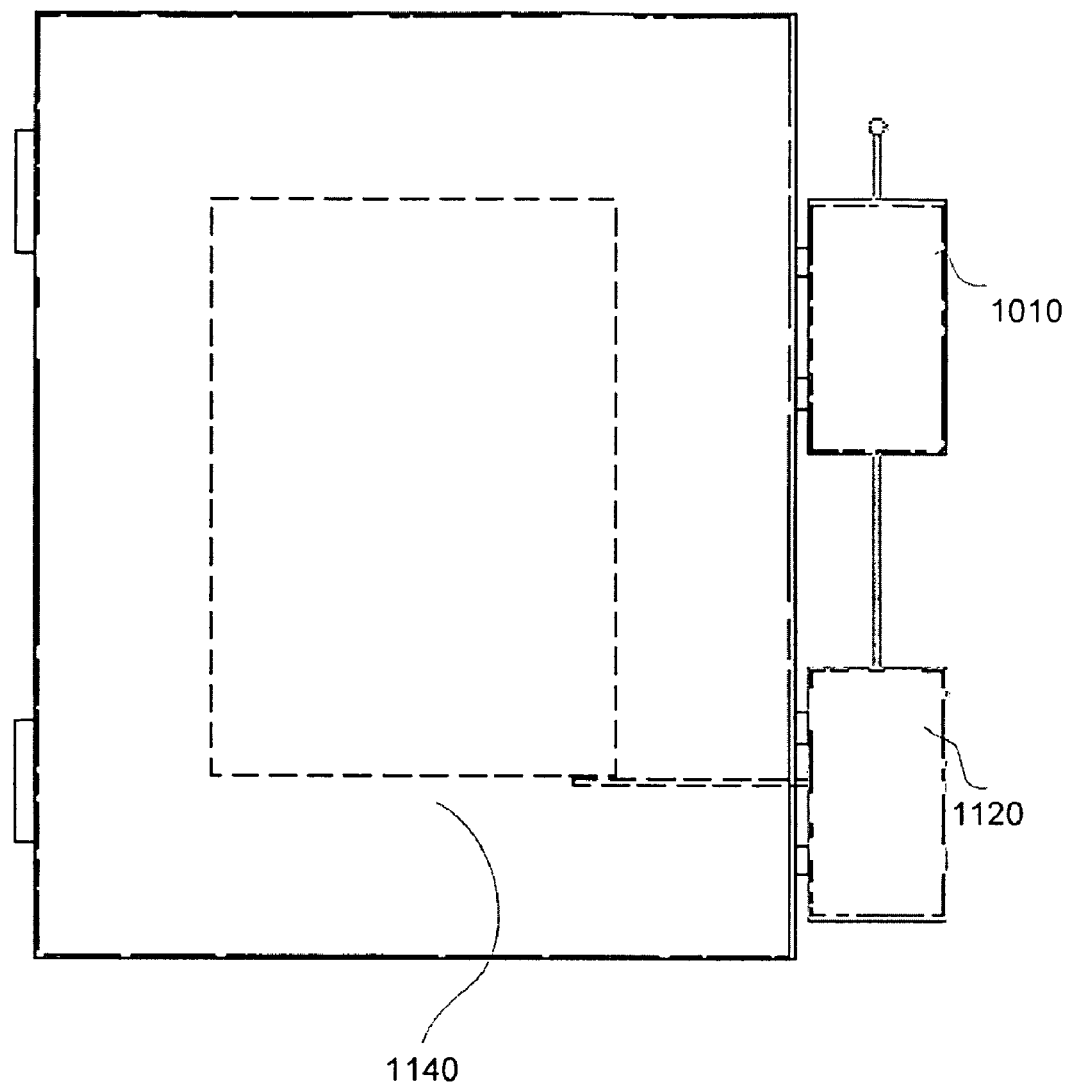
FIG. 11 shows a schematic view of a system where the communication device is co-located to the fuses in accordance with an exemplary embodiment.

FIG. 11 shows a schematic view of a system where the electrical panel communication device is co-located to the fuses 110 in accordance with an exemplary embodiment. An electrical panel communication device 1120 acts as an alternative to the portable communication device 140 in FIG. 10, which is used to identify open fuses in the electrical panel. The electrical panel communication device 1120 is coupled or adjacent to the electrical panel 1140 containing the fuses 110 and acts in the same manner as the portable communication device 140. The responses from identification elements 120 attached to the fuses 110 along with the electrical panel identification element 1010 (depending on the embodiment used) are received by the electrical panel communication device 1120 that may be coupled to or otherwise in range of the electrical panel 1140. The results of the interrogation may be displayed on a screen visible to a party inspecting the electrical panel communication device 1120.

Another alternative to the electrical panel communication device 1120 is the relay communication device. The relay communication device reads the status of the fuses as in the electrical panel communication device 1120. The relay communication device then retransmits the information to a remote location for inspection using a communication link, such as, for example, the internet or other network connection, a wireless connection (e.g., radio frequency), an optical communication link, etc. as those in the art will appreciate. The results of the interrogation may be displayed on a handheld device, a computer monitoring system or any other device that may be used for monitoring the states of the fuses.

The above described systems involving interrogation are not mutually exclusive. Any of the systems used to determine fuse status may be used separately or in any combination with each other.

Figure 12:
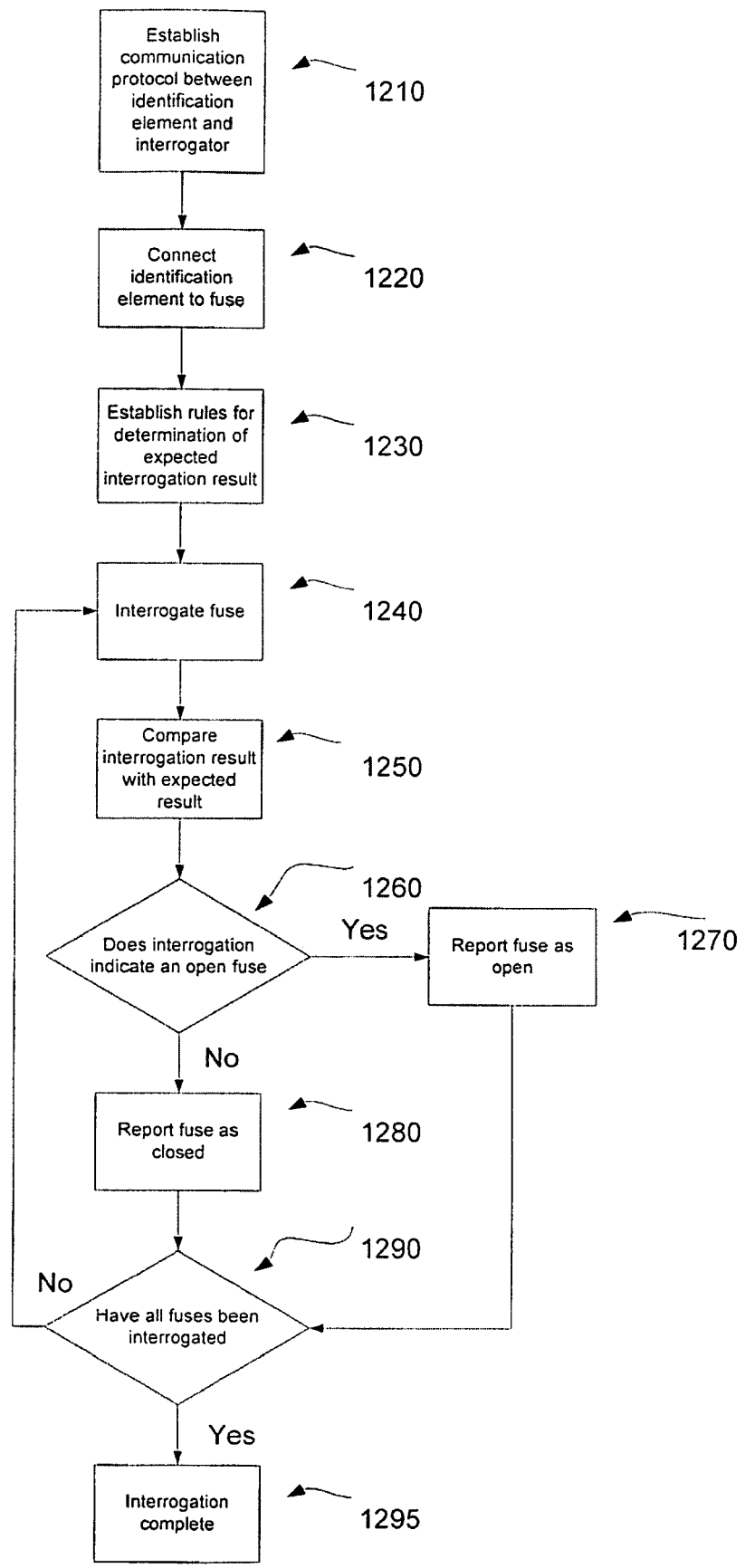
FIG. 12 illustrates a flowchart depicting a method for identifying open fuses in accordance with an exemplary embodiment.

FIG. 12 illustrates a flowchart depicting a method for identifying open fuses 110 in accordance with an exemplary embodiment. According to the methodology, the identification elements 120 and communication devices 140 first establish a common communication protocol at step 1210. This common communication protocol allows the communication devices 140 to interpret information sent by the identification elements 120 (and/or identification elements 1010). At step 1220, the identification elements 120 are coupled to fuses 110 in a manner that allows the identification elements 120 to communicate information about the state of each fuse 110. Once the identification elements 120 are coupled to fuses 110, the communication device 140 interrogating the identification elements 120 needs to determine which fuses 110 are inoperable. At step 1230, the communication device 140 establishes (or retrieves from memory) expected interrogation results or an algorithm to generate a list of expected interrogation results. At step 1240 the communication device 140 interrogates an identification element 120 and receives information from that identification element 120. The results of the interrogation are compared against the expected interrogation results at step 1250 to determine the status of the interrogated fuse 110. At step 1260 a determination is made as to whether the comparison of step 1250 indicates that the interrogated fuse 110 is open. If so, the interrogated fuse 110 is reported as open at step 1270. If not, the interrogated fuse 110 is reported as closed at step 1280. At step 1290 a determination is made as to whether a fuse 110 remains unchecked. If so, the process returns to (and is repeated from) step 1240 to interrogate the next fuse 110. If it is determined at step 1290 that all fuses 110 have been interrogated, the process completes at step 1295.

While the invention has been described in terms of various specific embodiments, those skilled in the art will recognize that the invention may be practiced with modifications within the spirit and scope of the claims. Having now described some exemplary embodiments of the system 100, it is believed that the programming of the system components to achieve desired outputs for monitoring the status of the fuses and the associated fuse system is within the purview of those skilled in the art.

What is claimed is:

1. An electrical fuse comprising:
a protective body;
terminal elements extending from said protective body;
a primary fuse element extending within said protective body and electrically connected between said terminal elements to define a primary current path, said primary fuse element constructed to open the primary current path upon an occurrence of a predetermined current condition, whereby electrical current can no longer be conducted in the primary current path and providing overcurrent protection to an electrical circuit completed through said terminal elements;
a secondary fuse link electrically connected between said terminal elements in parallel with the primary fuse element, whereby when the primary current path is open electrical current is conducted through the secondary fuse link; and
an identification element connected to the secondary fuse link, the identification element being configured to transmit a wireless signal to a remote device, wherein electrical current conducted through the secondary fuse link after the primary current path is opened alters said identification element and allows a determination by the remote device of whether the primary current path has opened.

2. An electrical fuse comprising:
a protective body;
terminal elements extending from said protective body;
a primary fuse element extending within said protective body and electrically connected between said terminal elements, said primary fuse element constructed to open upon an occurrence of a predetermined current condition, thereby providing overcurrent protection to an electrical circuit completed through said terminal elements;
a secondary fuse link electrically connected between said terminal elements, said secondary fuse link constructed to open upon operation of said primary fuse element; and
an identification element coupled to the secondary fuse link, the identification element being configured to transmit a wireless signal to a remote device when the primary fuse element is in an operational current carrying state;
wherein the state of said primary fuse element affects the transmission of said wireless signal from said identification element; and
wherein said identification element comprises an antenna coupled to said secondary fuse link in a manner that will render the antenna inoperable in the event of opening of said secondary fuse link, which results in the identification element not being able to transmit the wireless signal.

3. An electrical fuse in accordance with claim 2, further comprising a second identification element coupled to said electrical fuse; and
wherein said second identification element remains functional in the event of opening of said primary fuse element.

4. An electrical fuse comprising:
a protective body;
terminal elements extending from said protective body;
a primary fuse element extending within said protective body and electrically connected between said terminal elements, said primary fuse element constructed to open upon an occurrence of a predetermined current condition, thereby providing overcurrent protection to an electrical circuit completed through said terminal elements;
a secondary fuse link electrically connected between said terminal elements, said secondary fuse link constructed to open upon operation of said primary fuse element; and
an identification element coupled to the secondary fuse link, the identification element being configured to transmit a wireless signal to a remote device when the primary fuse element is in an operational current carrying state;
wherein the state of said primary fuse element affects the transmission of said wireless signal from said identification element; and
wherein said identification element comprises an antenna that broadcasts at an original central frequency while the primary fuse element is in an operational current carrying state; and
wherein said antenna broadcasts at an altered central frequency upon opening of the primary fuse element.

5. An electrical fuse in accordance with claim 4, wherein said altered central frequency is receivable by said remote device.

6. A fuse state indication system comprising:
a plurality of overcurrent protection fuses, each fuse comprising a primary fuse element and a secondary fuse link, the primary fuse element extending between terminal elements, said terminal elements configured for removable connection to line-side and load-side electrical circuitry and said terminal elements completing a current path through said primary fuse element, the current path of the primary fuse element opening upon a predetermined current flowing through the primary fuse element, the secondary fuse link electrically connected between said terminal elements in parallel with the primary fuse element, whereby current flows through said secondary fuse link when said current path of said primary fuse element has opened;
a plurality of wireless identification elements, each wireless identification element respectively connected to said secondary fuse link in each fuse and responsive to current flow in said secondary fuse link; and
an interrogation device configured to wirelessly communicate with said plurality of wireless identification elements to determine whether said current path in any of the primary fuse elements has opened.

7. A fuse state indication system in accordance with claim 6, wherein each said wireless identification element comprises an antenna configured to transmit a wireless signal to the interrogation device.

8. A fuse state indication system in accordance with claim 6, wherein said interrogation device is configured to transmit an interrogation request to each of said identification elements.

9. A fuse state indication system in accordance with claim 6, wherein said interrogation device is coupled to a location adjacent the fuses.

10. A fuse state indication system in accordance with claim 9, further comprising a device for relaying information collected by said interrogation device from said identification elements to a remote location.

11. A fuse state indication system in accordance with claim 6, wherein said interrogation device interprets wireless signals received from said wireless identification elements to identify any of said fuses in the opened stated based on a template, and wherein said template comprises a record of expected responses to be returned by said wireless identification elements.

12. A fuse state indication system in accordance with claim 6, further comprising:
at least one wireless panel identification element;
wherein each wireless panel identification element is coupled to an electrical panel containing said overcurrent protection fuses; and
wherein said interrogation device is configured to wirelessly communicate with said at least one wireless panel identification element to determine the location of said at least one wireless identification element and whether each of said fuses is in a current carrying state or an opened state.

13. A fuse state indication system comprising:
a plurality of overcurrent protection fuses, each fuse comprising a primary fuse element and a secondary fuse link, the primary fuse element extending between terminal elements, said terminal elements configured for removable connection to line-side and load-side electrical circuitry and said terminal elements completing a current path through said primary fuse element, the current path of the primary fuse element opening upon a predetermined current flowing through the primary fuse element, the secondary fuse link electrically connected between said terminal elements, said secondary fuse link constructed to open upon operation of said primary fuse element;
a plurality of wireless identification elements, each wireless identification element coupled to one of said fuses; and
an interrogation device configured to wirelessly communicate with said plurality of wireless identification elements to determine whether each of said fuses is in a current carrying state or an opened state;
wherein each said wireless identification element comprises an antenna configured to transmit a wireless signal to the interrogation device when the corresponding fuse is in the current carrying state; and
wherein each said antenna is configured to be inoperable when the corresponding fuse is in the opened state.

14. A fuse state indication system comprising:
a plurality of overcurrent protection fuses, each fuse comprising a primary fuse element and a secondary fuse link, the primary fuse element extending between terminal elements, said terminal elements configured for removable connection to line-side and load-side electrical circuitry and said terminal elements completing a current path through said primary fuse element, the current path of the primary fuse element opening upon a predetermined current flowing through the primary fuse element, the secondary fuse link electrically connected between said terminal elements, said secondary fuse link constructed to open upon operation of said primary fuse element;
a plurality of wireless identification elements, each wireless identification element coupled to one of said fuses; and
an interrogation device configured to wirelessly communicate with said plurality of wireless identification elements to determine whether each of said fuses is in a current carrying state or an opened state;
wherein each said wireless identification element comprises an antenna configured to transmit a wireless signal to the interrogation device when the corresponding fuse is in the current carrying state;
wherein each said antenna is configured to transmit an alternative wireless signal when the corresponding fuse is in the opened state.

* * * * *